United States Patent [19]

Clutter

[11] Patent Number: 5,076,449
[45] Date of Patent: Dec. 31, 1991

[54] LOAD MEASUREMENT SYSTEM FOR BOOM MOUNTED AUXILIARY ARM

[75] Inventor: Melvin E. Clutter, Centralia, Mo.

[73] Assignee: A. B. Chance Company, Centralia, Mo.

[21] Appl. No.: 485,262

[22] Filed: Feb. 26, 1990

[51] Int. Cl.$^5$ .......................... B66C 13/16; E04G 1/00
[52] U.S. Cl. ....................................... 212/157; 182/2; 414/680
[58] Field of Search .............. 901/49; 182/2; 340/666, 340/685; 212/149, 153, 157, 162, 163; 414/342, 348, 542, 543, 560–562, 336, 680

[56] References Cited

U.S. PATENT DOCUMENTS

| | | | |
|---|---|---|---|
| 3,918,037 | 11/1975 | Hall | 212/153 |
| 4,424,909 | 1/1984 | Begeron | 212/153 |
| 4,426,642 | 1/1984 | Poffenberger | 340/666 |
| 4,466,506 | 8/1984 | Dolenti . | |

FOREIGN PATENT DOCUMENTS

| | | | |
|---|---|---|---|
| 2138805 | 2/1973 | Fed. Rep. of Germany | 212/153 |
| 605784 | 5/1978 | U.S.S.R. | 212/153 |
| 958299 | 9/1982 | U.S.S.R. | 212/153 |

OTHER PUBLICATIONS

A. B. Chance Company Supplemental Catalog Bulletin, 7B-28.1 Oct., 1987, p. 1 of 1.
A. B. Chance Company Supplemental Catalog Bulletin 7B-13, Feb., 1980, p. 1 of 1.

Primary Examiner—Joseph F. Peters, Jr.
Assistant Examiner—R. B. Johnson
Attorney, Agent, or Firm—Hovey, Williams, Timmons & Collins

[57] ABSTRACT

A boom lift apparatus for use on a truck having a boom and a boom mounted bucket includes a mast selectively positionable on the boom at any of a plurality of different angles and supported on the boom for limited axial movement by a hydraulic cylinder which is fixed relative to one of the mast and the boom and movable relative to the other of the mast and boom, and a cooperating piston which is fixed relative to the other of the mast and the boom and movable relative to the one of the mast and the boom, the piston being received in the cylinder to define a variable volume in which pressure changes depending upon the position of the piston in the cylinder. A load measurement system is provided which includes a pressure measuring mechanism for measuring the pressure in the variable volume, the mechanism including a pressure gauge that includes a scale converted to indicate the load experienced by the mast as represented by the pressure in the variable volume.

5 Claims, 3 Drawing Sheets

LOAD MEASUREMENT SYSTEM FOR BOOM MOUNTED AUXILIARY ARM

BACKGROUND OF THE INVENTION

1. Field of the Invention

The present invention relates generally to a boom lift apparatus for use on a truck having a boom and a boom mounted bucket, and relates, more particularly, to a load measurement system and method of measuring the load experienced by a boom lift apparatus during use.

2. Discussion of the Prior Art

It is known from U.S. Pat. No. 4,466,506, issued on Aug. 21, 1984, to Dolenti, to provide a wire lift device for use on a jib of a bucket truck. The lift device includes a mast that is axially received in an adapter having a plurality of guide rollers for permitting relative axial movement of the mast while preventing angular movement thereof. A power winch is typically mounted on the boom of the truck and is connected to a rope or cable that extends between the winch and the bottom end of the mast such that operation of the winch moves the mast in the axial direction between raised and lowered positions.

It is also conventional to provide a load measurement system on known lift devices that is capable of roughly measuring the load experienced by the mast during a lifting operation. In such a conventional system, a spring is attached between the mast and the adapter, and an indicator is provided along with a scale for displaying the amount of deflection of the spring as well as the approximate force exerted on the spring by the load carried by the mast.

OBJECTS AND SUMMARY OF THE INVENTION

In accordance with one aspect of the invention, a boom lift apparatus includes a mast having a central longitudinal axis and positioning means for selectively positioning the mast on the boom with the longitudinal axis of the mast oriented at a selected angle relative to the boom and for securing the mast at the selected angle against further angular movement. Load measurement means are included for measuring the axial load experienced by the mast. The load measurement means includes support means for supporting the mast for limited axial movement relative to the boom in the direction of the central longitudinal axis, the support means including a hydraulic cylinder which is fixed relative to one of the mast and the boom and movable relative to the other of the mast and boom, and a cooperating piston which is fixed relative to the other of the mast and the boom and movable relative to the one of the mast and the boom. The piston is received in the cylinder to define a variable volume in which pressure changes depending upon the position of the piston in the cylinder, and pressure measuring and indicating means are provided for measuring the pressure in the variable volume, converting the measured pressure into an indication of the load experienced by the mast, and providing an indication of the load.

By this construction numerous advantageous results are achieved. For example, by providing the support means including a hydraulic cylinder and piston which together support the mast on the boom in addition to making up a part of a load measurement system, a relatively small, lightweight apparatus is obtained which is capable of generating an accurate indication of the load experienced by the mast while providing improved support to the mast. In addition, by supporting the mast directly on the boom, the apparatus is made capable of finding use on a wider variety of trucks, some of which do not include jibs of the type commonly used to support many conventional lift devices.

Another advantage of the present invention resides in the ability of the pressure measuring and indicating means to be positioned anywhere desired on the truck simply by providing a hydraulic line between the load indicator used with the apparatus and the hydraulic cylinder. Thus, the indicator may be positioned in or near the bucket so that a lineman operating the boom is able to readily determine the amount of load exerted on the lift apparatus.

A warning signal may also be generated in response to a sensed pressure in the hydraulic cylinder, the signal being perceptible to the operator so that he is quickly notified that a predetermined load is being exerted on the lift device and is able to remove the load from the lift device before the load is further increased.

BRIEF DESCRIPTION OF THE DRAWING FIGURES

A preferred embodiment of the present invention is discussed in detail below with reference to the attached drawing figures, wherein.

DETAILED DESCRIPTION OF THE PREFERRED EMBODIMENT

Figure 1:
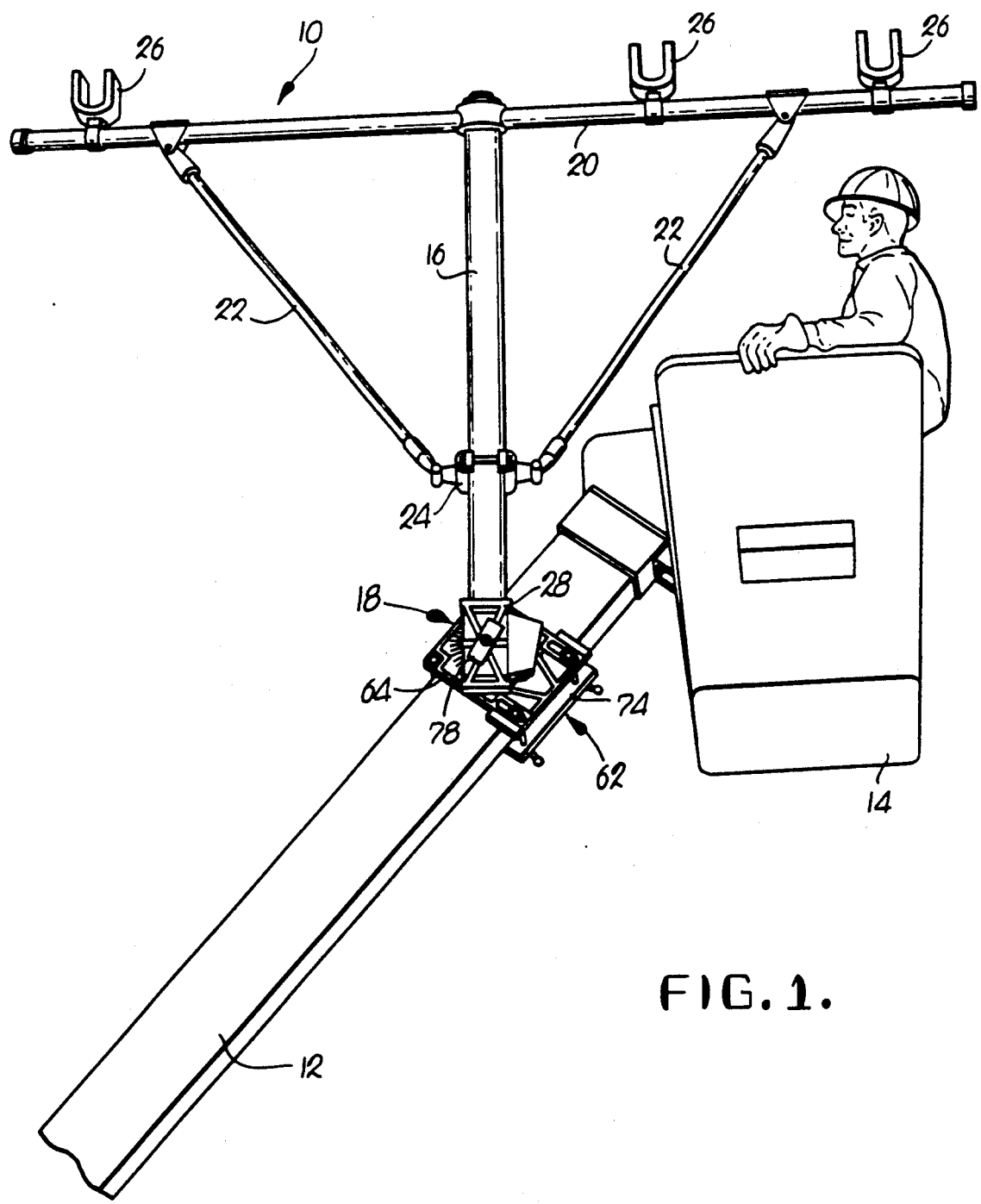
FIG. 1 is a perspective view of a boom lift apparatus constructed in accordance with the preferred embodiment.

A boom lift apparatus 10 for use on a truck having a boom 12 and a boom mounted bucket 14 is illustrated in FIG. 1, and includes a mast 16 supported on the boom by a load measurement and overload warning system 18.

The mast 16 is constructed as an elongated member having a central longitudinal axis and an rectangular cross-sectional shape, and is formed of an insulative material. For example, the mast may be constructed of a fiberglass-wrapped, foam core such as from an EPOXIGLAS ® pole marketed by the A. B. Chance Company of Centralia, Mo., U.S.A. The mast 16 is fitted at an upper end thereof with a horizontal arm 20 also constructed of an insulative material which may comprise, e.g. a solid fiberglass pole such as an EPOXIROD ® pole which is also constructed by the A. B. Chance Company.

Diagonal braces 22 extend upward from the mast 16 from an adjustable brace clamp 24 and are secured to the horizontal arm 20 to help rigidify the boom lift apparatus 10. Also, a number of wire holders 26 are fastened to the horizontal arm 20 which are adapted to retain and support overhead power lines so that a worker in the bucket 14 is able to carry out maintenance and other work on a utility pole or the like which would otherwise normally support the power lines.

Figure 2:
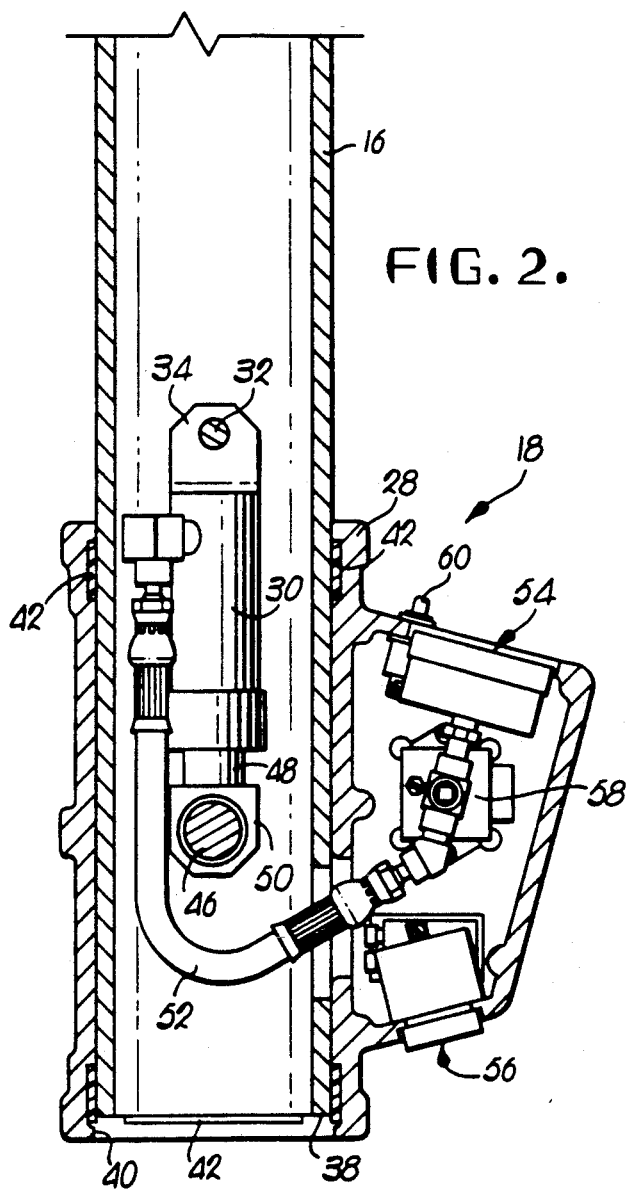
FIG. 2 is a side sectional view of a mast and mast housing of the lift apparatus.
Figure 4:
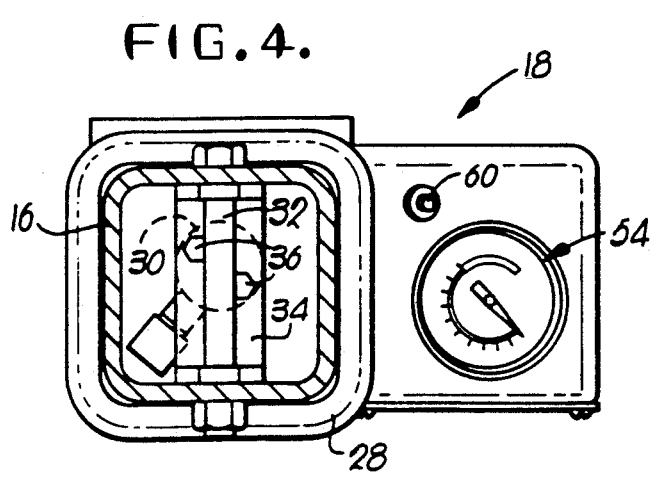
FIG. 4 is a top sectional view of the mast and mast housing.

The lower end of the mast 16 is shown in FIG. 2, as is a mast housing 28 which supports the mast 16 for limited axial movement relative to the housing. Within the lower end of the mast 16, a hydraulic cylinder 30 is provided which is secured to the mast by a transverse shaft 32 comprised of a threaded bolt extending completely through the mast, and a bracket 34 pivotally supported on the shaft 32 and being fixed to the upper end of the cylinder 30 by a pair of bolts 36. The manner in which the bracket 34 is attached between the cylinder 30 and the transverse shaft 32 is illustrated in FIG. 4. The hydraulic cylinder 30 extends downward from the bracket 34 toward a bottom end 38 of the mast.

The housing 28 includes a vertical aperture 40 extending therethrough which is shaped to match the shape of the mast 16, and a plurality of slide strips 42 are secured to the inside surface of the housing to permit relative axial movement of the mast 16 within the housing 28. Thus, the cooperation between the mast and housing is such that little or no relative movement is permitted in any direction other than in the axial direction of the mast. The strips 42 preferably are formed of a material having a low coefficient of friction to encourage relative sliding movement between the mast 16 and housing 28 and may, e.g. be formed of an acetal resin such as that marketed under the registered trademark DELRIN. As an alternative, other known friction reducing expedients may be employed to encourage free relative axial movement between the mast and housing.

Figure 3:
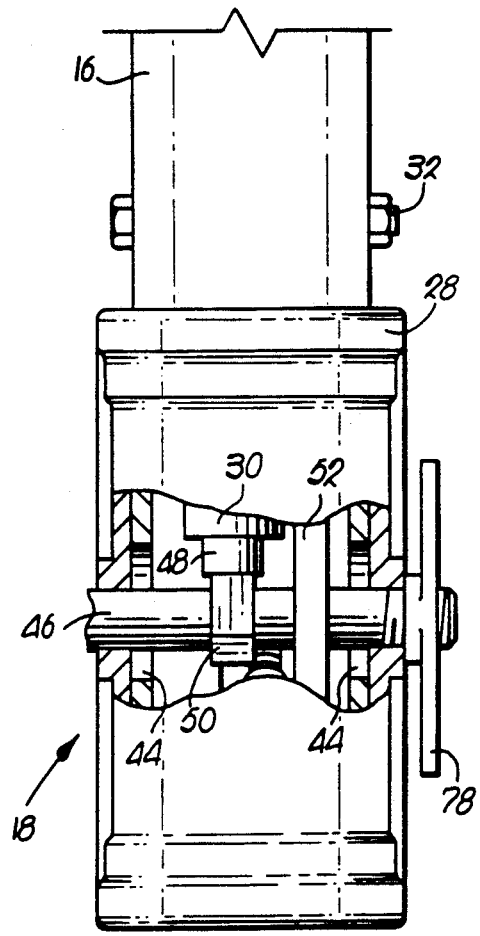
FIG. 3 is a front elevation view, partially cut away, of the mast and mast housing.

As depicted in FIG. 3, the mast 16 is provided with two opposed slots 44 of identical construction extending axially along the length of the mast on opposite sides thereof. These slots 44 align generally with a transverse pivot shaft 46 which extends through the mast 16 and the mast housing 28 and which is fixed to the boom 12 in a manner to be described. A piston 48 is pivotally retained on the shaft 46 by a collar 50, and extends upward and is received within the hydraulic cylinder in a conventional manner such that a variable volume is defined within the cylinder within which a hydraulic fluid is disposed.

A hydraulic line 52 is in communication with the variable volume of the hydraulic cylinder 30 and permits the pressure of the hydraulic fluid in the variable volume to be exerted on a pressure gauge 54 attached to the mast housing 28 in a position which is visible to a lineman positioned in the bucket 14. Although the gauge 54 is shown as being attached to the housing 28, it is noted that the gauge may be positioned in the bucket 14 or at the base of the boom 12 depending on the position of the operator of the boom. The gauge 54 is a pressure gauge which is preferably marked in units of load force as determined by precalculating the magnitude of force experienced by the cylinder 30 and piston 48 for any given pressure in the variable volume.

A warning indicator 56 is also provided on the mast housing 28 or at any other desirable location, the indicator 56 providing an audio warning indication when the pressure as sensed by a pressure switch 58 exceeds a preset value. For example, in the preferred embodiment, the pressure switch 58 is an adjustable pressure sensitive switch which closes when the pressure sensed exceeds a predetermined value set by the operator, thus causing the warning indicator 56 to be connected with a battery or other power source as described below. A test button 60 may also be provided on the mast housing 28 to permit testing of the warning indicator 56.

Figure 6:
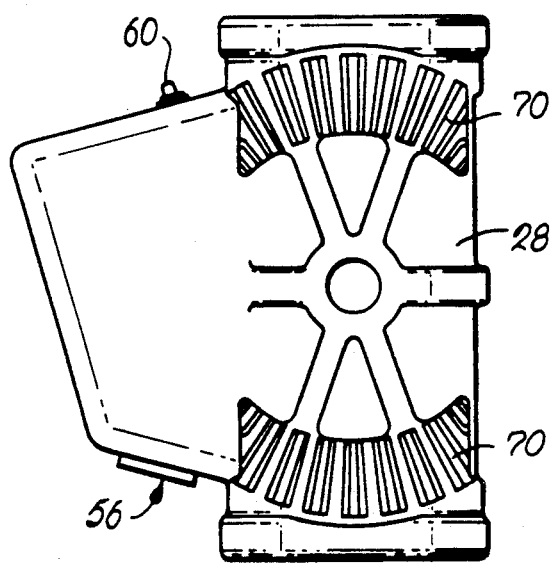
FIG. 6 is a side elevation view of the mast housing.
Figure 7:
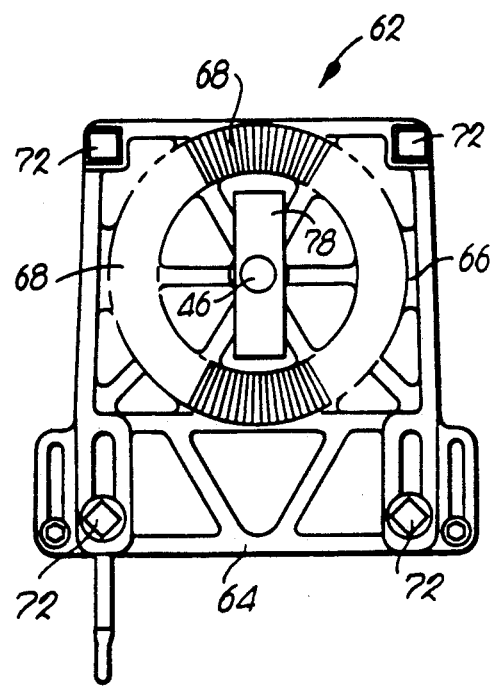
FIG. 7 is a side elevation view of a base plate assembly.
Figure 8:
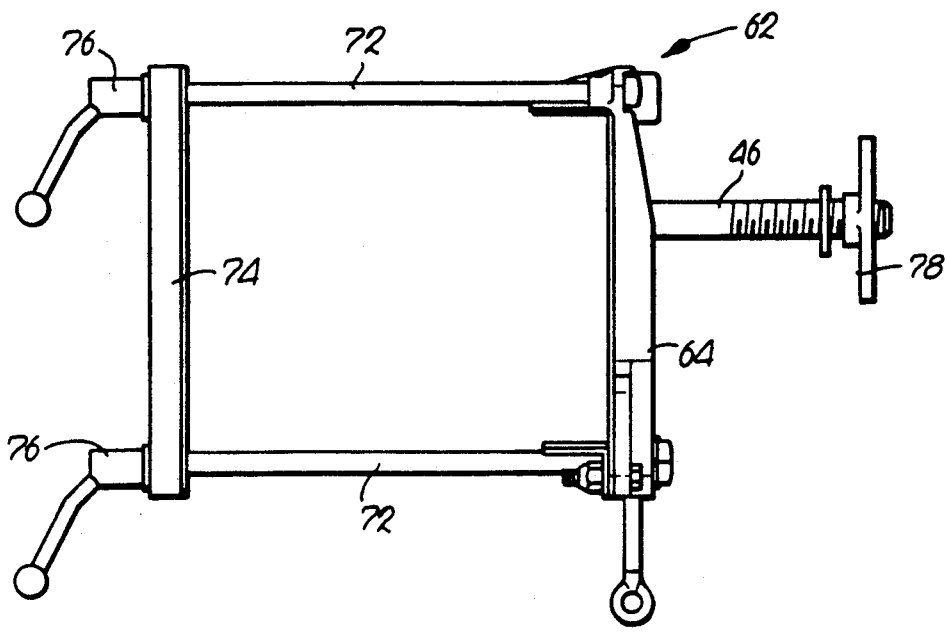
FIG. 8 is a front elevation view of the base plate assembly.

A boom base assembly 62 of the boom lift apparatus is shown in FIGS. 7 and 8, and as shown in FIG. 7 includes a base plate 64 having a face 66 adapted to be directed outward when the base plate 64 is attached to the boom 12. This outward directed face 66 includes a pattern of radially extending teeth 68 disposed about a center point which is coincident with the pivot shaft 46 which is secured to the base plate 64. As is depicted in FIG. 6, the mast housing 28 also includes a pattern of teeth 70 which are oriented and sized to cooperate with the teeth 68 of the base plate 64 when the mast housing is attached thereto.

The base plate 64 is fastened to the boom 12 by a plurality of attachment rods 72, shown in FIG. 8, extending through both the base plate 64 and an attachment plate 74, the attachment plate being disposed on the opposite side of the boom 12 as is the base plate and including means for tightening the attachment rods 72 to secure the base plate 64 to the boom. For example, tail nuts 76 or the like may be provided adjacent the attachment plate 74 to permit manual attachment and detachment of the boom base assembly 62 on the boom.

The pivot shaft 46 is threaded adjacent at least the axially outer end thereof and may be fitted with a wing nut 78 or the like that may be used to secure the mast housing 28 against the base plate 64 once the mast 16 and mast housing 28 have been oriented at a desired angle relative to the mast by the lineman.

In operation, once the angle of the mast 16 and mast housing 28 relative to the boom 12 has been adjusted, the wing nut 78 is tightened against the mast housing forcing the housing against the boom base plate 64 such that the teeth 70 of the housing 28 engage and are held by the teeth 68 of the base plate 64. Thereafter, the lineman operates the lift apparatus 10 via hydraulic controls within the bucket 14 or adjacent the base of the boom 12 and lifts a desired load, e.g. one to three electrical distribution lines.

During lifting of the lines by the lift apparatus 10, any load experienced by the mast 16 relative to the boom 12 is exerted on the hydraulic cylinder 30 and piston 48 interposed between the mast 16 and the boom 12 such that the pressure within the variable volume of the cylinder 30 increases. This increase in pressure is a function of the area of the piston opposed to the variable volume and the magnitude of the pressure, and may be expressed in terms of the load force if the conversion between pressure and force is precalculated and the scale of the gauge 54 is printed to reflect these calculations.

Figure 5:
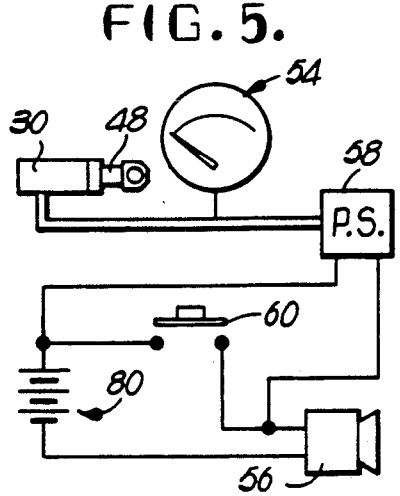
FIG. 5 is an electrical schematic diagram of the electrical circuit employed in the load measurement system of the preferred embodiment.

As shown in FIG. 5, the warning indicator 56 includes a horn or other signalling device, which is included in an electrical circuit including a power source 80 and the pressure switch 58. When the preset pressure magnitude of the pressure switch is exceeded, the pressure switch closes the circuit causing the horn 56 to go off. The test button 60 is also disposed in the circuit to permit testing of the horn.

Although the invention has been described with reference to the preferred embodiment illustrated in the attached drawing, it is noted that substitutions may be made and equivalents employed herein without departing from the scope of the invention as recited in the claims.

What is claimed is:

1. A boom lift apparatus for use on a truck having a boom and a boom mounted bucket, the lift apparatus comprising:

a mast having a central longitudinal axis;

positioning means for selectively positioning the mast on the boom with the longitudinal axis of the mast oriented at a selected angle relative to the boom and for securing the mast at the selected angle against further angular movement, the positioning means including a mast housing retained on the mast for angular movement with the mast, a base plate secured to the boom, and means for securing the mast housing to the base plate with the longitudinal axis of the mast oriented at the selected angle; and load measurement means for measuring the axial load experienced by the mast, the load measurement means including, support means for supporting the mast for limited axial movement relative to the boom in the direction of the central longitudinal axis, the support means including a hydraulic cylinder which is fixed relative to one of the mast or the boom and movable relative to the other of the mast or boom, and a cooperating piston which is fixed relative to the other of the mast or the boom and movable relative to the one of the mast or the boom, the piston being received in the cylinder to define a variable volume in which pressure changes depending upon the position of the piston in the cylinder, and pressure measuring and indicating means for measuring the pressure in the variable volume, converting the measured pressure into an indication of the load experienced by the mast, and providing an indication of the load, wherein the mast includes a slot extending in a transverse direction through the mast and the mast housing includes a hole which is aligned with the slot during relative movement between the mast and the mast housing, the means for securing the mast to the base plate including a pivot shaft fixed to the base plate and extending through the hole in the mast housing and through the slot in the mast such that the mast housing is pivotally supported on the boom, the mast being supported in the mast housing for limited axial movement relative to the mast housing in the direction of the central longitudinal axis.

2. The boom lift apparatus as recited in claim 1, wherein the cylinder is supported on and fixed relative to the mast and the piston is supported on and fixed relative to the pivot shaft.

3. A boom lift apparatus for use on a truck having a boom and a bucket mounted on the boom, the lift apparatus comprising:

a mast having a central longitudinal axis, an arm connected to the mast and extending in a direction substantially transverse to the central longitudinal axis thereof, the arm including at least one holder adapted to support a power line;

positioning means for selectively positioning the mast on the boom with the longitudinal axis of the mast oriented at a selected angle relative to the boom and for securing the mast at the selected angle against further angular movement the positioning means including a mast housing mounted on the mast for angular movement with the mast, a base plate, means for securing the mast housing to the plate with the longitudinal axis of the mast oriented at the selected angle;

load measurement means for measuring the axial load experienced by the mast, the load measurement means including, support means for supporting the mast for limited axial movement relative to the boom in the direction of the central longitudinal axis, the support means including a hydraulic cylinder which is fixed relative to either one of the mast or the boom and movable relative to the other of the mast or boom, and a cooperating piston which is fixed relative to either the mast or the boom, the piston being received in the cylinder to define a variable volume in which pressure changes depending upon the position of the piston in the cylinder, pressure measuring and indicating means for measuring the pressure in the variable volume, converting the measured pressure into an indication of the load experienced by the mast, and providing an indication of the load.

4. The boom lift apparatus as recited in claim 3, wherein the pressure measuring and indicating means includes a pressure gauge provided with a scale marked in units of load force corresponding to the pressure in the variable volume.

5. The boom lift apparatus as recited in claim 3, further comprising warning indicator means for generating a perceptual warning signal when the pressure as sensed by the pressure measuring and indicating means exceeds a predetermined maximum pressure.

* * * * *